US008745318B2

(12) United States Patent
Rub et al.

(10) Patent No.: US 8,745,318 B2
(45) Date of Patent: Jun. 3, 2014

(54) PARAMETER TRACKING FOR MEMORY DEVICES

(75) Inventors: Bernardo Rub, Sudbury, MA (US); Ara Patapoutian, Hopkinton, MA (US); Bruce Buch, Westborough, MA (US)

(73) Assignee: Seagate Technology LLC, Cupertino, CA (US)

( * ) Notice: Subject to any disclaimer, the term of this patent is extended or adjusted under 35 U.S.C. 154(b) by 287 days.

(21) Appl. No.: 13/170,794

(22) Filed: Jun. 28, 2011

(65) Prior Publication Data

US 2013/0007343 A1 Jan. 3, 2013

(51) Int. Cl.
*G06F 12/00* (2006.01)

(52) U.S. Cl.
USPC .......................................................... 711/103

(58) Field of Classification Search
USPC .......................................................... 711/103
See application file for complete search history.

(56) References Cited

U.S. PATENT DOCUMENTS

| 2008/0270730 | A1 | 10/2008 | Lasser et al. | |
| 2010/0074024 | A1 | 3/2010 | Roohparvar | |
| 2010/0131697 | A1 | 5/2010 | Alrod et al. | |
| 2011/0283049 | A1* | 11/2011 | Kang et al. | 711/103 |
| 2013/0061101 | A1* | 3/2013 | Fitzpatrick et al. | 714/718 |
| 2013/0086454 | A1* | 4/2013 | Rub | 714/773 |
| 2013/0094288 | A1* | 4/2013 | Patapoutian et al. | 365/185.03 |
| 2013/0094290 | A1* | 4/2013 | Sridharan et al. | 365/185.03 |

* cited by examiner

*Primary Examiner* — Reginald Bragdon
*Assistant Examiner* — Mehdi Namazi
(74) *Attorney, Agent, or Firm* — Hollingsworth Davis, LLC

(57) ABSTRACT

Methods and systems involve collecting memory device parameters and using memory device parameters to determine memory wear information. A set of first parameters associated with wear of the memory device is monitored for at least one memory unit of the memory device. The first parameters are compared to respective trigger criterion. If the comparison reveals that one or more of the first parameters are beyond their trigger criterion, then collection of a second set of parameters is triggered. The second parameters are also indicative of the wear of the memory device. The set of first parameters may overlap the set of second parameters. The set of second parameters are used to develop memory wear information. In some implementations, the memory wear information may be configuration information used to configure the read/write channel to compensate for wear of the memory device. In some implementations, the memory wear information may be used to predict or estimate the lifetime of the device.

19 Claims, 16 Drawing Sheets

PARAMETER TRACKING FOR MEMORY DEVICES

SUMMARY

Some embodiments described herein involve systems and methods for collecting memory device parameters and using collected memory device parameters to configure read/write channel operations and/or to predict the lifetime of a memory device. For example, a method of operating a controller for a charge storage memory device includes monitoring a set of first parameters associated with wear of at least one of the memory units of a memory device. Monitoring the first set of parameters involves measuring the set of first parameters at each of multiple first intervals during a time period that the memory device is in operation, e.g., over the lifetime of the device. The first parameters are compared to respective trigger criterion. If the comparison reveals that one or more of the first parameters are beyond their trigger criterion, then collection of a second set of parameters is triggered. The second parameters are also indicative of the wear of the memory device and may be collected at multiple second intervals. The set of first parameters may overlap the set of second parameters. The set of second parameters are used to develop memory wear information. In some implementations, the memory wear information may be configuration information used to configure the read/write channel to compensate for wear of the memory device. In some implementations, the memory wear information may be used to predict or estimate the lifetime of the device.

The set of first parameters and/or the set of second parameters and/or the memory wear information may be stored in a storage area within a memory unit block. When the memory unit block is being garbage collected, any stored parameters and memory wear information are moved to a temporary storage location and then these parameters/information may be re-stored in the memory unit block after the memory unit block has been erased. If new values for the parameters and/or memory wear information has been determined during the garbage collection operation, the updated parameters/information are stored in the memory unit block after the memory unit block has been erased.

In some cases the monitored and/or collected parameters from multiple memory units are combined into block level parameters. For example, first parameters may be combined into block level first parameters and may be compared to block level trigger criteria. In some cases a historical profile is formed using the set of second parameters, the set of first parameters or both first and second parameters.

Some embodiments involve a controller for a memory device. The controller includes a block level operation module configured to perform block level operations on multiple memory blocks that include multiple memory units. A parameter control module is configured, each memory block, to monitor a set of first parameters associated with wear of at least one memory unit of the multiple memory units by measuring the set of first parameters of the at least one memory unit during each of multiple block level operations. The parameter control module compares the first parameters to respective trigger criterion. In response to the comparison, if the first parameters are beyond their respective trigger collection, the parameter control module is configured to collect a set of second parameters associated with wear of the memory block. A channel control module is configured to develop memory wear information using the set of second parameters.

The memory device may comprise a charge based storage device such as flash memory.

In some implementations, the block level operation module comprises a garbage collection module and the block level operations are garbage collection operations. In some implementations, the first set of parameters is monitored for at least one memory unit that has a higher wear rate than other memory units of the memory block. Each memory block may include a storage area where the set of first parameters and/or the set of second parameters and/or other information for the memory block are stored.

In some cases, the memory device comprises multilevel memory cells capable of storing a most significant bit (MSB) and a least significant bit (LSB). A memory unit of MSBs and a memory unit of LSBs are stored together in one physical memory unit. The parameter control module is configured to measure the set of second parameters for the memory unit of MSBs and to measure the set of second parameters for a memory unit of LSBs and to aggregate the set of second parameters for the MSB memory unit and the set of second parameters for the LSB memory unit into an aggregate set of second parameters.

In some implementation, the parameter control module is configured to increase a frequency at which the set of second parameters are collected based on the set of first parameters.

DETAILED DESCRIPTION

Figure 1:
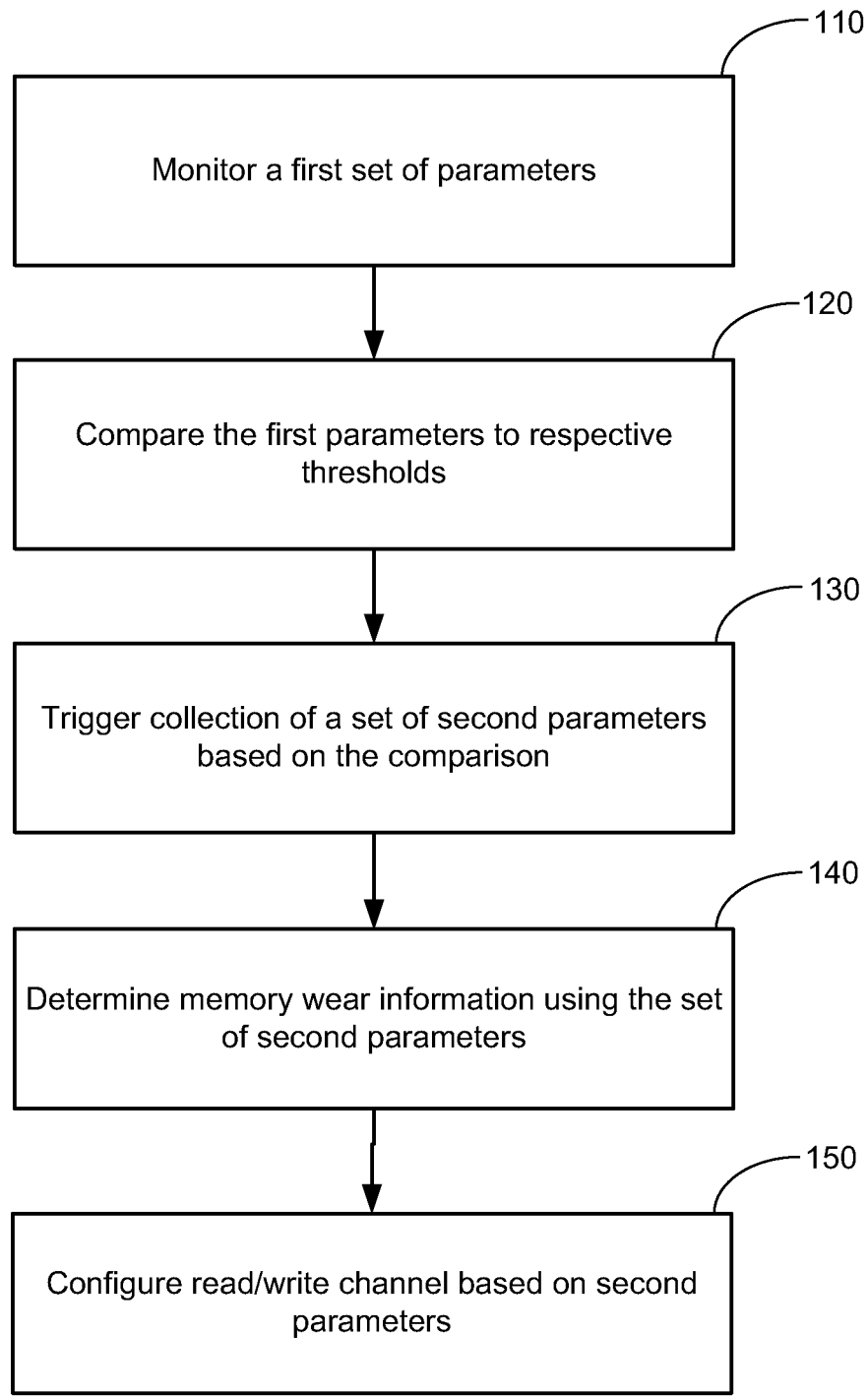
FIG. 1 is a flow diagram that illustrates tracking parameters of a memory device in accordance with some embodiments.

Some memory devices that are based on the storage of charge experience degradation caused by various factors including the number of times that the memory cells are erased, among other factors. The degradation may result in a decreased ability to retain charge, and/or a greater sensitivity to mechanisms that may disturb the stored charge. As memory cells degrade, the read/write channel parameters used to access the memory cells may need to be modified to compensate for the aging memory cells in order to maintain a predetermined error rate. For example, memory cells that have experienced degradation may require different reference voltages used to read the data stored in the memory cells and/or stronger error correction codes to correct for errors present in the data.

Some embodiments described herein involve systems and methods for collecting memory device parameters and using memory device parameters to configure read/write channel operations. For example, configuring read/write channels may involve setting programming voltages, reference voltages, detector lookup tables, and/or encoder/decoder characteristics. In some cases, the collected parameters may be used to provide a lifetime estimate for the memory device or portions thereof.

Collecting memory device parameters involves an investment in system overhead in terms of process cycles to measure the parameter values and memory to store the parameter values. As illustrated below in various embodiments, parameter collection can be accomplished selectively to reduce the impact on system overhead needed for measuring and/or storing parameter values. For example, selective collection may be accomplished using one or more trigger criterion to indicate that the memory cells are undergoing a change and that the read/write channel may need to be re-configured to compensate for the change. In some cases, parameter collection involves monitoring a first set of memory device parameters which are used to trigger collection of a second set of memory device parameters. After the triggering occurs, the second set of memory device parameters is collected and the second parameters are used to develop memory wear information. The memory wear information is used to configure the read/write channel of the memory device. In some cases, a wear rate of the memory units based on the second parameters and/or a historical profile of the second parameters may be formed.

Some embodiments described herein involve systems and methods of determining pages exhibiting a predetermined performance characteristic and using the parameters of these pages to develop memory wear information to configure the read/write channel. In some cases, the pages exhibiting the predetermined performance characteristic may be those exhibiting the worst performance or alternatively, those exhibiting an average or intermediate performance. For example, the worst performing pages may be those having the highest bit error rate (BER) and/or having experienced the highest number of program/erase (P/E) cycles, and/or having widest sensed voltage distributions and/or other factors related to degradation of the memory cells.

Determining pages having a predetermined performance characteristic, e.g., worst performance, may involve measuring parameters of the pages, e.g., BER, voltage distributions, etc., and ranking the pages based on the measured parameters.

In some cases using pages having the predetermined performance characteristic may be implemented in conjunction with triggering criteria. For example, configuring the read/write channel may be performed using the parameters of the worst performing pages in conjunction with other collected parameters.

As denoted in this disclosure, a memory cell is the smallest unit of storage of a memory device. A memory cell may be a single level cell, capable of storing one bit of data, or may be a multi-level memory cell, capable of storing multiple data bits. Memory cells can be grouped into memory units, denoted as pages herein, and pages can be grouped into blocks of pages. The terms cell, page and block as used herein are not necessarily limited to any specific organizational scheme, e.g., such as the logical addresses of the pages. For example, the term "page" refers to any grouping of memory cells and the term "block" refers to any grouping of pages. In some cases, a page refers to the smallest readable unit of the memory device and a block refers to the smallest eraseable unit of the memory device.

As used herein, monitoring and/or collection of parameters may include one or more of measuring or otherwise determining parameter values, temporarily storing the parameter values, and/or storing the parameter values long term. The second parameters are used to develop the memory wear information which is used to configure the read/write channel. The first parameters may be used to trigger collection of the second parameters. Measured values of the first and/or second parameters may be used to derive other parameters. For example, measured values of the BER may be used to derive the rate of change of the BER.

In some implementations, one or more blocks of memory may be involved in block level operations in which one or more blocks are accessed over a relatively short period of time. These block level operations can involve some type of memory maintenance task. One example of a block level operation is garbage collection. For example, one or more blocks may form a garbage collection unit (GCU) which is an erasure unit of a garbage collection operation. The blocks of a GCU are erased at substantially the same time during garbage collection. Other examples of block level operations include operations such as cache write operations and/or direct memory access operations in which the controller controls access to the memory device. The memory controller may opportunistically initiate block level monitoring/collection of memory device parameters during times that the memory device is idle. The block level operations may be controlled by the memory controller and may take place independently of read and write requests initiated by a host.

Between garbage collection erasure times, the pages of the GCU are written to (programmed). In some circumstances, the pages of a GCU may all be written to at substantially the same time, e.g., within a few seconds or minutes of each other. In other circumstances, the pages of the GCU may be written to in groups over a longer period of time, e.g., hours, days, weeks, months. Regardless of whether the memory cells of the GCU are written to at substantially the same time, or in page groups over a longer time interval, the cycle of erasing the GCU and subsequently writing to the GCU is referred to herein as program/erase (P/E) cycle. Each P/E cycle of the GCU includes at least one erase operation of the GCU and one or more write operations.

In some cases, as illustrated in the flow diagram of FIG. 1, tracking parameters of a memory device involves monitoring a set of first parameters of at least one memory unit. The set of first parameters are indicative of the wear experienced by the memory unit. Monitoring the set of first parameters involves measuring the first parameters at multiple first intervals over a time period that the memory device is in operation. The multiple first intervals can occur according to any time schedule, but may conveniently correspond to the timing intervals at which the controller performs block level operations such as garbage collection.

The first parameters are compared 120 with respective thresholds. In response to the comparison, collection of a set of second parameters may be triggered 130. For example, collection of the second parameters may be triggered in response to one or more of the first parameters being beyond a threshold. The second parameters may be collected according to second intervals with may occur according to any schedule but may also conveniently correspond to the timing intervals of garbage collection operations or other block level operations. The set of second parameters are used to develop 140 memory wear information which can be used to configure 150 the read/write channel and/or can be used for other purposes. Configuring the read/write channel may involve selecting reference voltages used in determining data stored in the memory cells, selecting the error correction code (ECC) for the read/write channel, and/or other processes.

In some cases, monitoring/collection of parameters may occur during garbage collection and/or other convenient intervals. For example, if a block has been idle for a predetermined period of time, the controller may opportunistically measure the first parameters of one or more pages in the block.

In some cases, the second set of parameters and the first set of parameters may overlap such that at least one parameter in the set of first parameters is also a parameter within the set of second parameters as will be described in more detail in the discussion of FIGS. 3A-3D. Various parameters that may be indicative of the wear experienced by a memory unit can include, for example, bit error rate, a bitmap indicating the error rate of the memory cells of a page, counts for specific error events and/or retry counts, write time (the time the page was last written), number of program/erase cycles experienced by the page, erase time (the time the page was last erased), wear rate, write temperature (the temperature at the last writing or historical write temperatures), and storage temperature (recent storage temperatures or historical storage temperatures), number of iterations needed for convergence of the data, the page number, whether the page is a most significant bit page or a least significant bit page, among other possible parameters. Wear rate may be based on a rate of change of a parameter. Voltages used when writing to the memory cells, sensed voltage distributions of the pages and/or reference voltages used to read the memory cells may also indicate memory unit wear.

Returning to FIG. 1, in some implementations, a first parameter comprises the BER of a memory unit. When the BER exceeds a threshold, collection of a set of second parameter is triggered. The second parameters are the sensed voltage distributions of the memory unit. The memory wear information, e.g., information used to configure the channel to compensate for memory wear, comprises reference voltages used to read the memory cells of the memory unit. As can be appreciated, determination of the BER requires less overhead than determination of the voltage distributions. Thus, determination of the voltage distributions only occurs after the BER exceeds a predetermined threshold.

When the memory device is new, it would be wasteful to determine the voltage distributions for a page or block each time the page of block is garbage collected because this detailed information may not be needed to compensate for device wear. However, each device exhibits wear idiosyncratically and it is also non-optimal to assume that all devices have the same wear characteristics. Collecting parameters that require more system overhead only when these parameters need to collected based on trigger criteria reduces system overhead and adapts to the particular wear characteristics of a device.

In some cases, the first set of parameters is monitored during each block-level operation that the page or block undergoes. For example, the set of first parameters of a page or pages of a memory block may be monitored each time the block is garbage collected. In some cases, more than one parameter in the first set of parameters may be used to trigger the collection of a second set of parameters. In some cases, the calculation of a composite first parameter (some combination of multiple first parameters) may be used for triggering the collection of the set second parameters. A composite of second parameter, which is a combination of multiple second parameters) may be determined. For example, a composite second parameter could be a differential between a block erase time and the time that a page in the block is written.

Figure 2A:
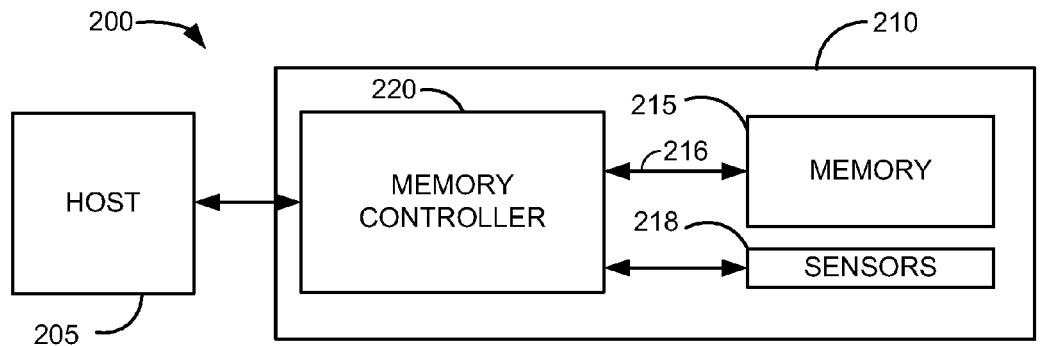
FIG. 2A is a block diagram of a system capable tracking parameters in accordance with some embodiments.
Figure 2B:
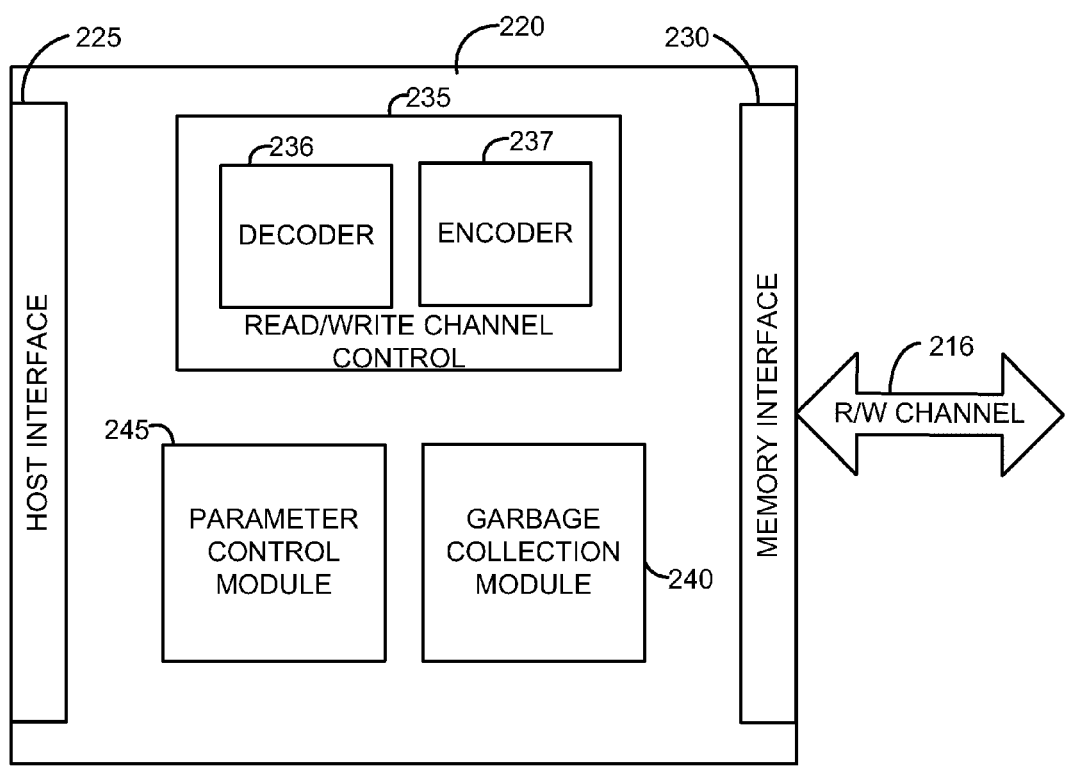
FIG. 2B is a block diagram of a memory controller in accordance with some embodiments.

FIGS. 2A and 2B are block diagrams of a system 200 capable tracking parameters in accordance with embodiments discussed herein. The system 200 includes a memory device 210 and a host 205. The memory device 210 may comprise a memory 215 having multiple memory cells arranged in pages, and blocks, optional sensors 218, and a memory controller 220 that provides an interface between the memory device 210 and the host 205. Data is transferred between the memory 215 and the memory controller 220 through a read/write channel 216 (which may comprise multiple subchannels). The host 205 may be any type of computing system. The memory device 210 may correspond, for example, to a charge-based memory device and/or a solid state memory device and/or a non-volatile memory device. For example, the memory device 210 may comprise a flash memory device. Alternatively the memory device may correspond to a magnetic memory device and/or a hybrid memory device. The sensors may include a temperature sensor that is capable of sensing the temperature of the memory device, for example, the temperature of the device at the time of a write operation or storage temperature.

The block diagrams of FIGS. 2A and 2B and/or other diagrams discussed herein show system components and/or processes divided into functional blocks. It will be appreciated by those skilled in the art that there exist many possible configurations in which these functional blocks can be arranged and implemented. The examples depicted herein provide some possible functional arrangements for system components. For example, in some implementations, all or a portion of the functionality of the memory controller 220 may be included within the host 205 and/or may be included within the memory device 210. The various approaches described herein may be implemented using hardware, software, or a combination of hardware and software, for example.

FIG. 2B illustrates the memory controller 220 in more detail. A host interface 225 facilitates the transfer of data and control signals between the memory controller 220 and the host 205. A read/write channel control module 235 is configured to configure the read/write channel 216 used to access the memory device. As described herein, the read/write channel control module 235 may retrieve first and/or second parameters from memory and/or may determine memory wear information. In some implementations, the memory wear information comprises information used to configure the read/write channel 216 to compensate for memory wear.

In some implementations, the memory wear information is memory lifetime information for the memory device or portions of the memory device.

In some cases, the read/write channel control module 235 includes an encoder 237 and/or a decoder unit 236. The encoder 237 may encode any data to be stored in the memory 215 using an error correcting code (ECC). This encoded data can then be stored to the memory 215 through the memory device interface 230 and the read/write channel 216. When data is to be read from memory, the encoded data is read from the memory device 210 through the R/W channel 216 and is decoded using the decoder unit 236. The encoded data is decoded using the ECC and is transferred to the host 205 via the host interface 225. The encoder 237 and decoder 236 units use the ECC to attempt to detect and/or correct errors that are present in the data read from the memory device 210. Configuring the read/write channel 216 may include, for example, setting the reference voltages used to read the memory cells of the memory device and/or setting the ECC used to encode and/or decode the data.

As illustrated in FIG. 2B, the controller also may include a garbage collection module 240 (or other control module that controls block level operations of the memory device 210). The need for garbage collection arises because some types of non-volatile memory devices may not be able to directly overwrite changed data, but may need to first perform an erase operation in memory before new data is written. Garbage collection is performed on garbage collection units (GCU) or erasure units as denoted herein, which may include one or more blocks of data. At the time of garbage collection, the memory units of the memory device may include pages storing valid data, pages storing expired data that is no longer valid, and open pages that have not been written to since erasure of the data unit. In some cases, parameter information is collected for a group pages and/or blocks of pages in a GCU during garbage collection. The term parameter information may encompass monitored and/or collected parameters and/or any other metadata associated with the pages including metadata that can be to configure the read/write channel. The erase process for GCU first ensures that any valid data currently residing in that GCU is moved to another location, or held in a buffer until this GCU is ready for programming. Once a GCU is erased, that GCU is ready for new data to be written to the GCU.

Because garbage collection may be performed periodically on all pages of the memory, it provides a convenient schedule for monitoring and/or collecting parameters of the garbage collected pages. All of the pages in the GCU may be read during garbage collection and updated parameter values may be determined for some or all of the pages. In some cases, parameters for some pages may be monitored and/or collected during garbage collection while parameters for other pages may not be monitored and/or collected.

FIG. 2B also includes a parameter control module 245 that controls the monitoring and/or collection of parameters associated with one or more pages in the memory device 210. The parameters are used by the read/write channel control module 235 in the development of memory wear information. The memory wear information can be used to configure the read/write channel 216.

In some cases, monitored and/or collected parameters and/or memory wear information may be stored in a header section residing within a block of pages. In some cases, some or all of the parameter information for a block of pages is stored in a location other than in the block. For example, parameter information may be stored in temporary storage that is located elsewhere in the memory or in the memory controller.

In some implementations, the parameters of more than one page (such as a block of pages) may be used to determine a block-level parameter that characterizes the block of pages. The block-level parameter may be a statistical value such as a mean, a median, a standard deviation or other value calculated using the parameters of the multiple pages. In some implementations, a block-level parameter may be based on a ranking of page parameters and may be a worst case of the parameter.

In some implementations, triggering collection of a second set of parameters may be based on a first set of parameters associated with a portion of the pages of a block. For example, triggering collection of the second set of parameters may be based on parameters of the worst performing page or pages in the block. The worst performing page or pages may be the page or pages of the block that have the highest bit error rate or highest wear rate of the block of pages, for example. The parameter values for these worst performing pages may be compared to one or more thresholds, and collection of a second set of parameter values is triggered in response to one or more parameters from the first set of parameters being beyond the threshold. As previously discussed, parameters may be monitored at intervals of time that are periodic and/or are based on block level operations, for example. The intervals used for monitoring the first set of parameters may be shorter or longer than the intervals used for collecting the second set of parameters.

In some implementations, the controller may randomly select pages of a block to use for configuration of the read/write channel. For example, the controller may randomly select pages for monitoring the set of first parameters for the purpose of triggering collection of second parameters. The controller may randomly select pages for collecting second parameters which are used to develop the memory wear information used to configure the read/write channel.

Figure 3A:
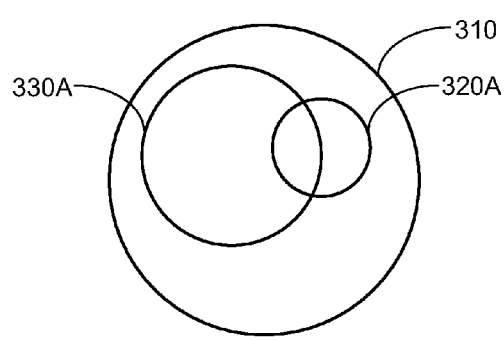
FIGS. 3A-3D illustrate various relationships between a set of first parameters and a set of second parameters in accordance with various embodiments.

FIGS. 3A-3D show examples of relationships between the set of first parameters (monitored parameters) and the set of second parameters (collected parameters). As previously discussed, the set of first parameters can be used to trigger collection of the set of second parameters. In FIG. 3A, a parameter superset 310 is shown that contains both the set of first parameters 320A and the set of second parameters 330A. In this case, the set of first parameters 320A is smaller than the set of second parameters 330A and the two sets of parameters 320A, 330A overlap such that some of the parameters that are in the set of first parameters 320A are also in the set of second parameters 330A. According to this example, there are also some parameters from the set of first parameters 320A that are not in the set of second parameters 330A.

Some of the parameters from the set of second parameters may comprise a value derived from first parameters. In some cases, the set of second parameters could include an average value or a rate of change of one of the first parameters. For example, a first parameter may be the BER of a page and a second parameter may be the rate of change of the BER.

Figure 3B:
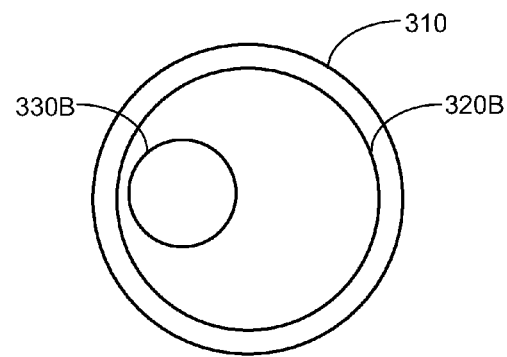

FIG. 3B shows an example in which the set of first parameters 320B of the superset of parameters 310 contains the set of second parameters 330B. In this case, each parameter of the set of second parameters is also a parameter of the set of first parameters. However, according to FIG. 3B a parameter of the first set 320B may or may not also belong to the set of second parameters 330B.

Figure 3C:
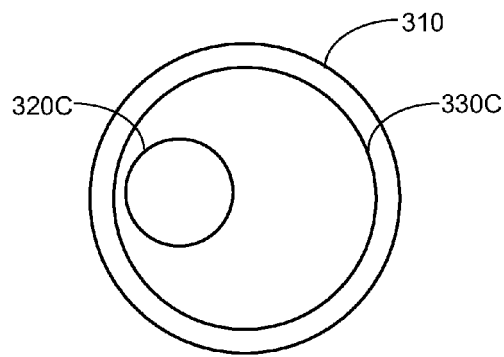

FIG. 3C shows an example in which the set of second parameters 330C of the superset of parameters 310 contains the set of first parameters 320C. In this case, each parameter of the set of first parameters 320C is also a parameter of the set of second parameters 330C. However, a parameter of the second set 330C may or may not also belong to the first set 320C.

Figure 3D:
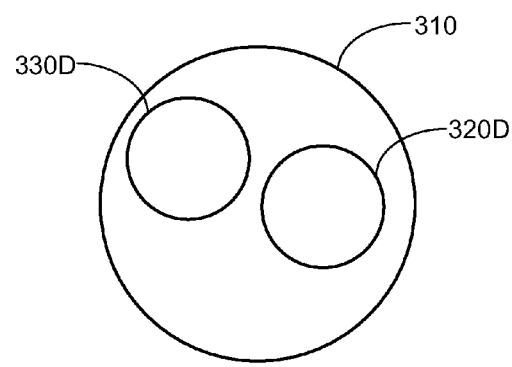

FIG. 3D illustrates a parameter superset 310 containing a set of first parameters 320D and a set of second parameters 330D. In this case, the set of first parameters 320D and the set of second parameters 330D do not overlap. Therefore, in this case, a parameter included in the set of first parameters 320D would not be present in the set of second parameters 330D and vice versa.

Figure 4A:
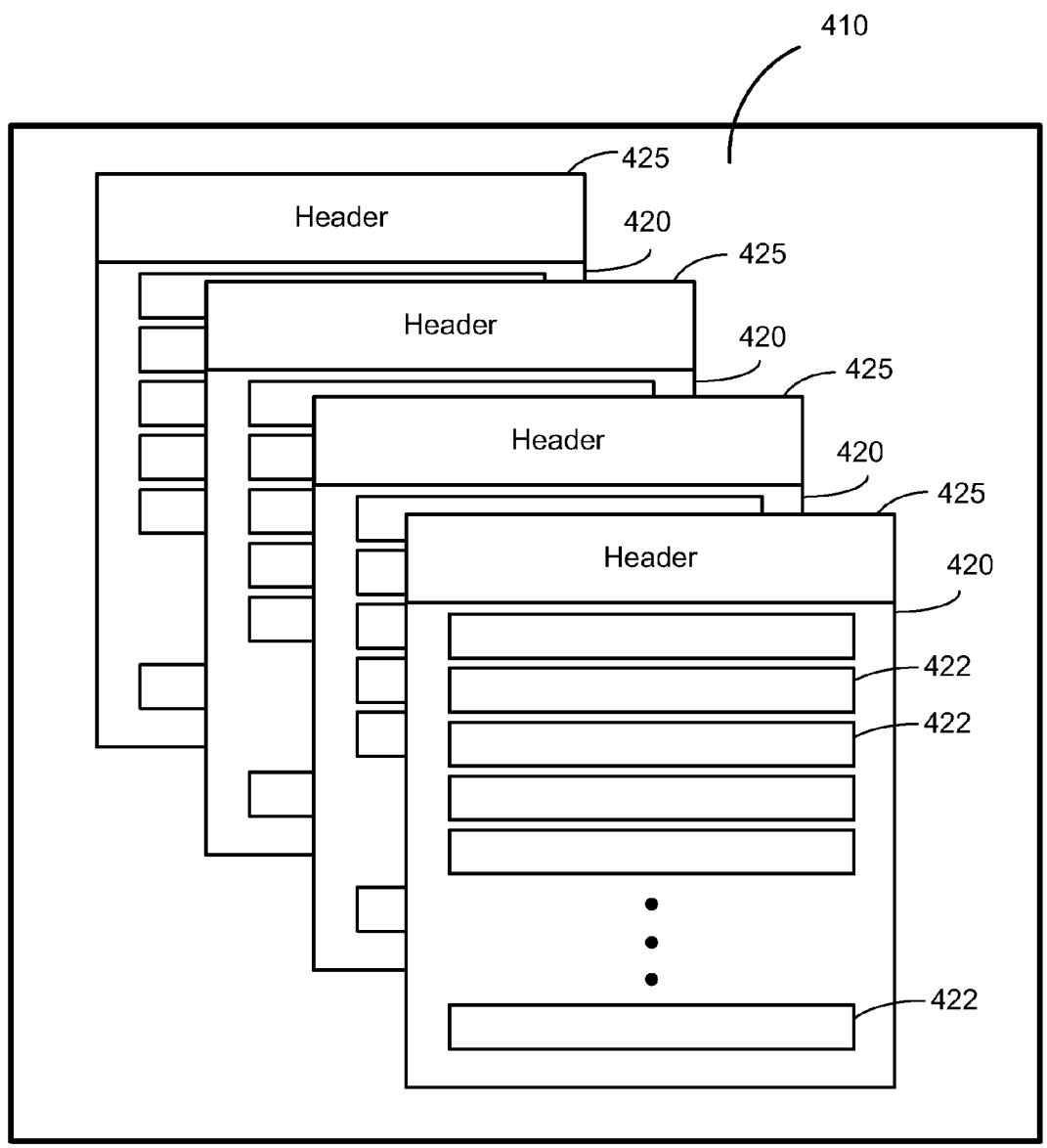
FIGS. 4A and 4B illustrate configurations for storage areas for parameter storage in accordance with various embodiments.

FIG. 4A illustrates a possible organization of the memory (215, FIG. 2A) and a storage area in more detail. As previously discussed, the memory can be organized into a number of blocks 420, each block 420 containing a number of pages 422. In some cases, each block 420 includes a storage area 425, e.g., block header, that for storing first and/or second parameters and/or memory wear information for the pages 422 in the block 420. In some implementations, the first parameters, second parameters and/or memory wear information may be stored in a location other than within the block, such as elsewhere in the memory device, in the controller and/or in the host.

Figure 4B:
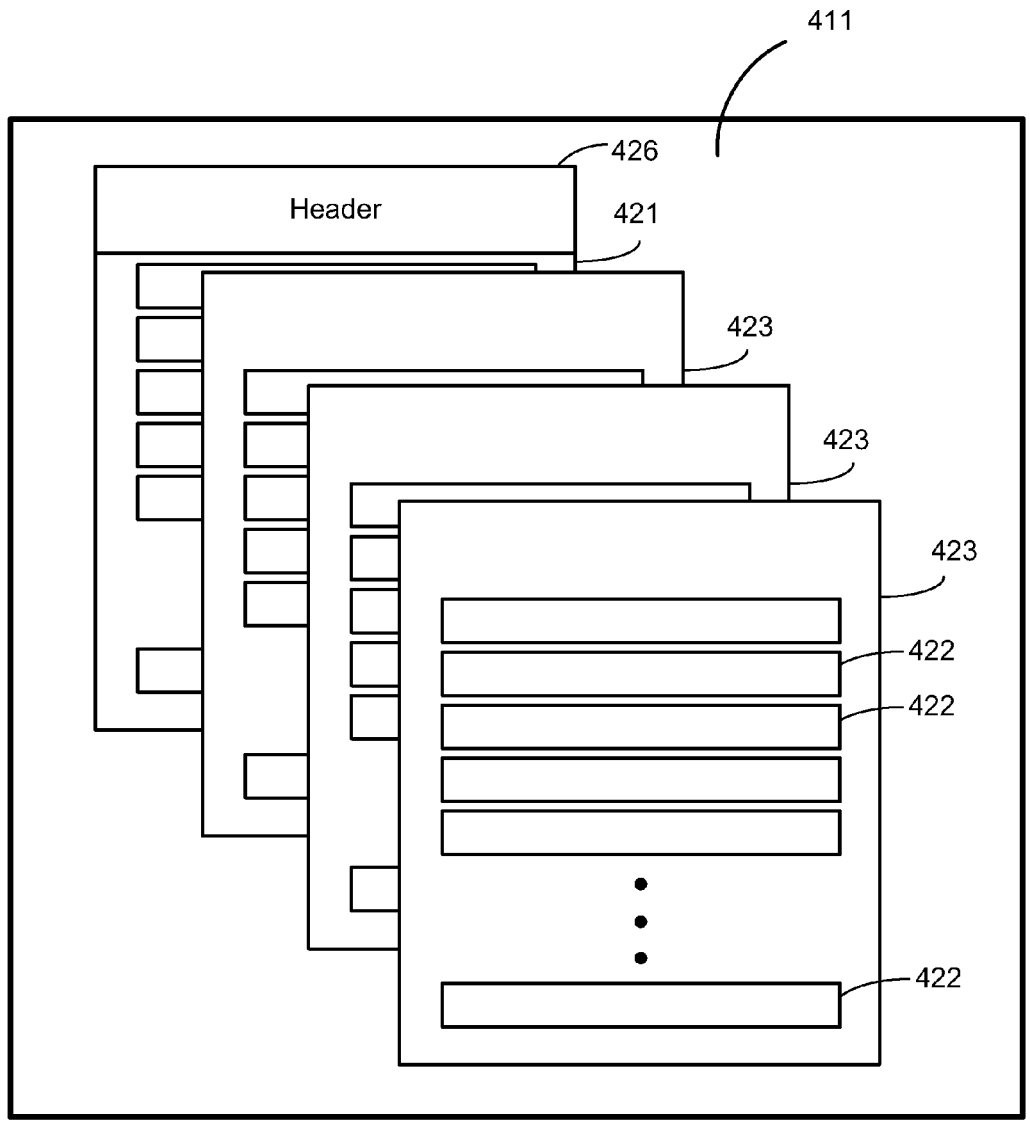

FIG. 4B shows another possible configuration for the storage area. In this example, multiple blocks 421, 423 of pages 422 are arranged in a larger unit 411, e.g., a GCU. One of the blocks 421 of the GCU includes the storage area 426 as a block header. The block header 426 may store first and/or second parameters and/or memory wear information for all of the blocks of the GCU. In some cases, the parameters and/or wear information are aggregated at a block level, e.g., to account for part-to-part variations.

In some cases, the parameters may be stored in several areas in the memory. For example, the block header may store a timestamp of the time that the block was last erased. Each page of the block may store a differential time that indicates when the page was written.

In some implementations, information needed to access a page or a block of pages may be stored in a temporary location (volatile or non-volatile memory) to minimize latency when accessing the memory.

In some types of memory, data is written sequentially, so it may be particularly useful to temporarily store parameters for configuring a write channel so that only a single read of the storage area is needed to write large portion of memory, e.g., a block or group of blocks.

Reading the memory can be random or sequential. Random reads can incur significant latency if the parameter storage area needs to be read before each read operation. To reduce latency, the parameter storage area may be read and the memory wear information used to configure the read channel may be stored in a temporary location. For example, information needed to read a group of pages, such as the ECC code rate and/or other on-the-fly mode read parameters, may be stored in the temporary location. On-the-fly mode pertains to the first read of a page. If error recovery needs to occur, then the device enters an error recovery mode.

Figure 4C:
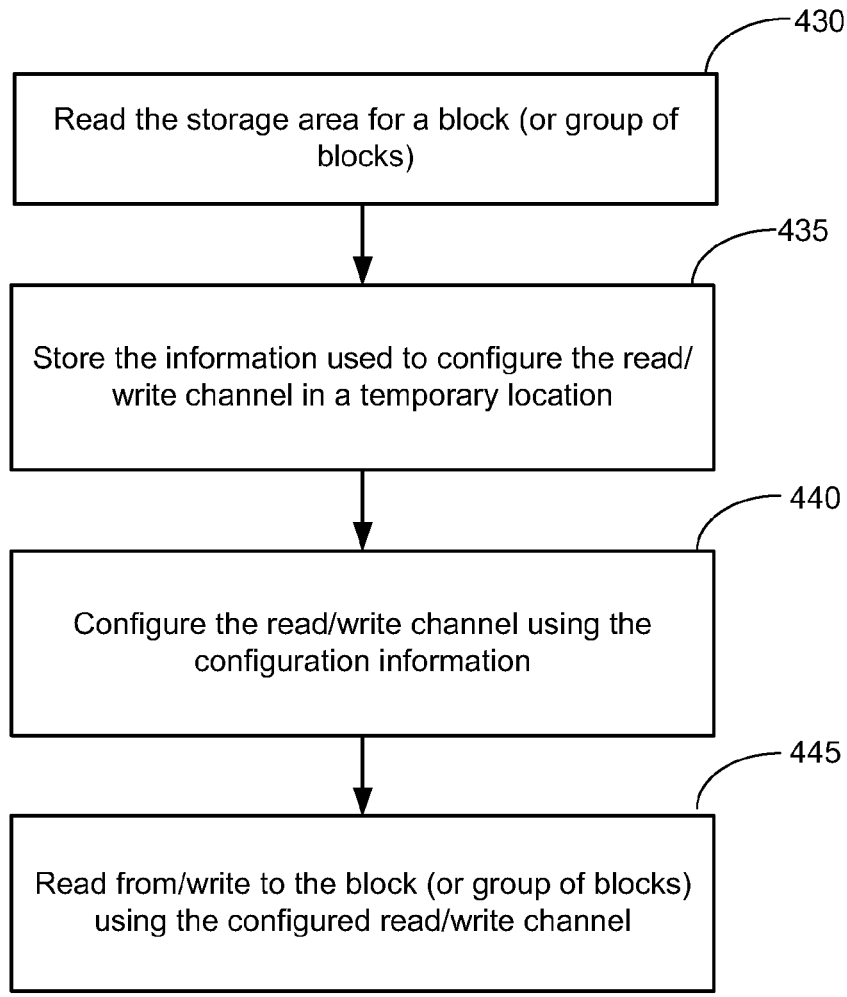
FIG. 4C is a flow diagram that illustrates storing information in temporary storage and using the temporarily stored information to configure the read/write channel to compensate for memory wear in accordance with various embodiments.

FIG. 4C illustrates storing information for configuration the read/write channel to compensate for memory wear in temporary storage for use in writing or reading a large portion of memory. The information used for configuration of the read/write channel may be first parameters, second parameters, and/or information determined from the first and/or second parameters for configuring the read/write channel (memory wear information).

The information is read 430 from the storage area for the block or group of blocks. The channel configuration information is stored 435 in temporary storage. For example, prior to performing read or write operations, information needed for configuring the write channel may be stored in the temporary storage. In some cases, the configuration information may be directly used to configure the read/write channel. In some cases, the information, e.g., first and/or second parameters may be used to determine the configuration parameters. The read and/or write channels are configured 440 using the configuration information and the read and/or write operations are performed 445.

In some implementations, the parameters of a number of pages in a block may be monitored. The pages may be ranked according to some predetermined criteria and N pages selected from the ranking. The pages corresponding to a predetermined performance criterion, e.g. pages having the worst performance based on BER, or pages having intermediate performance may be identified. Parameters may be monitored or collected for the pages having the predetermined performance characteristics.

Figure 5A:
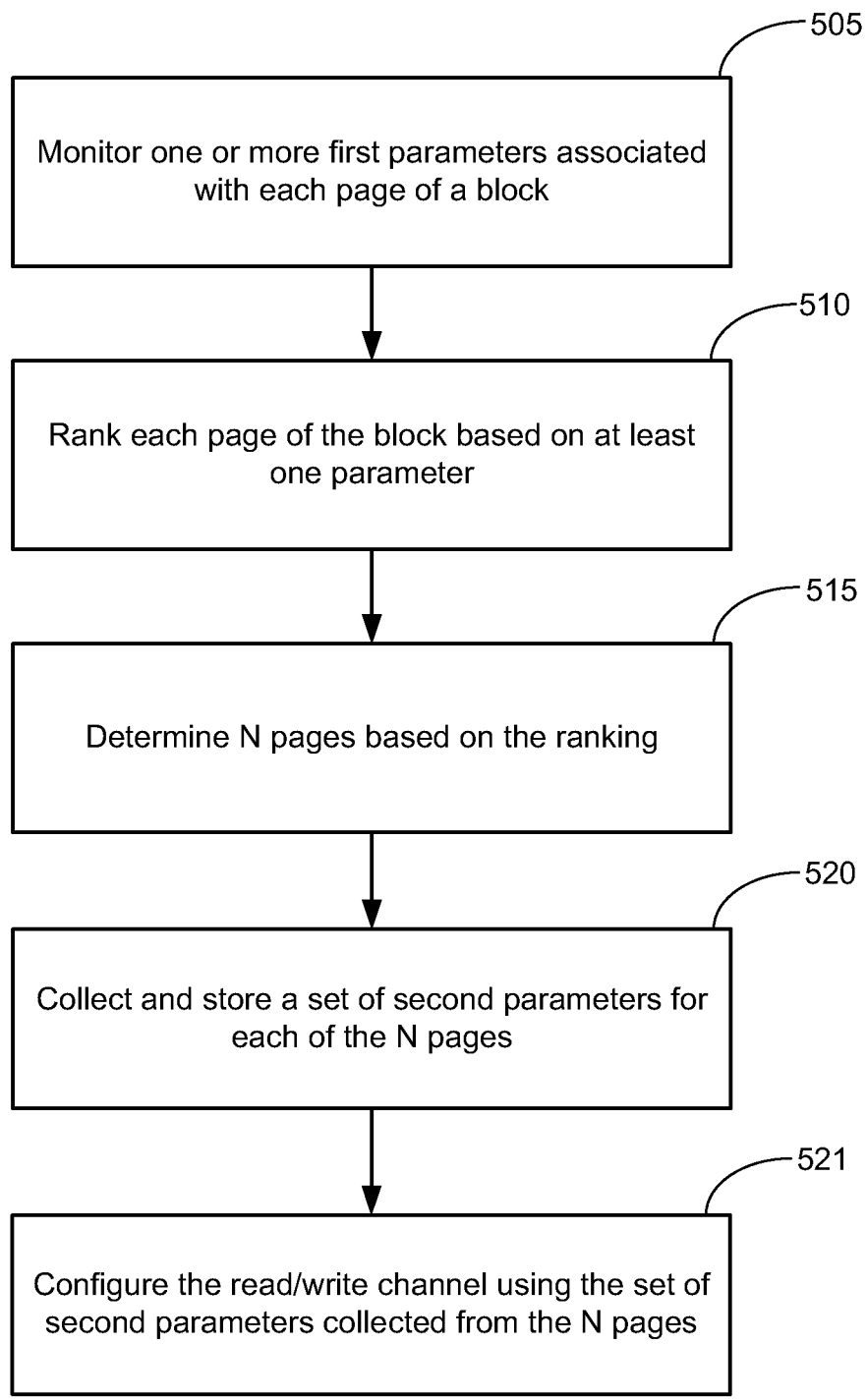
FIG. 5A is a diagram that illustrates an exemplary process for ranking pages according to performance in accordance with some embodiments.

FIG. 5A is a diagram that illustrates an exemplary process for ranking worst performing pages. One or more first parameters associated with each page of a block of pages are acquired 505. Each page in the block of pages is ranked 510 according to the first parameters. For example, the pages may be ranked according to a bit error rate and/or a page number. In some cases, the pages may be ranked according to more than one first parameters or a combined parameter that is determined from more than one first parameter. A number, N, e.g., 8, 16, 32, etc., of worst performing pages are identified 515 based on the ranking. A set of second parameters from the worst performing pages may be collected 520 and used to develop memory wear information. The read/write channel is configured 521 using the memory wear information. Similar processes may be used to determine pages having performance characteristics other than worst performing, e.g., to determine pages having intermediate performance.

Figure 5B:
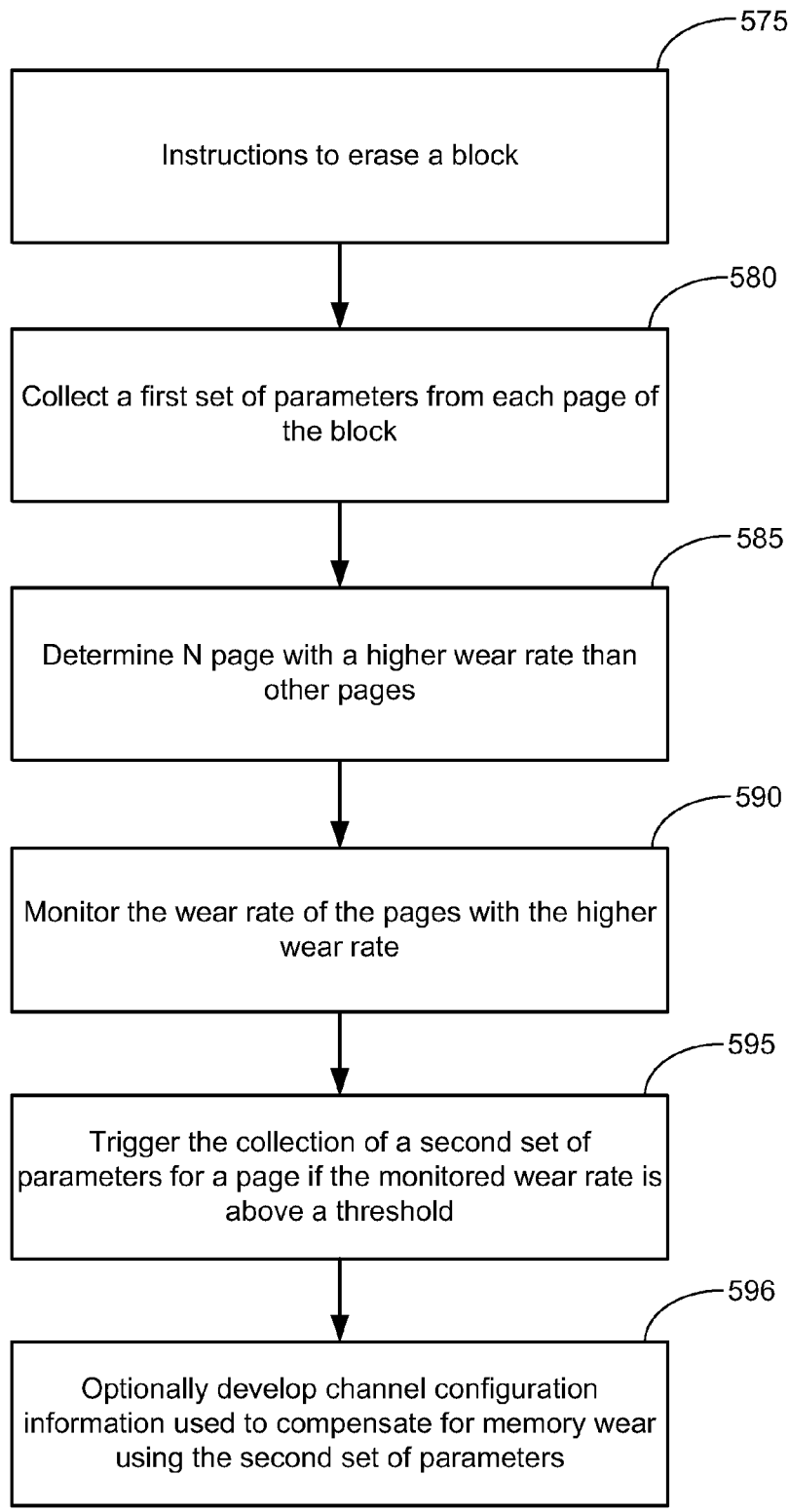
FIG. 5B is a flow diagram that illustrates triggering collection of second parameters based on pages that are ranked according to a predetermined performance characteristic in accordance with some embodiments.

The flow diagram of FIG. 5B illustrates another example that is based on monitoring the worst performing pages of a block of pages. Instructions indicate that a block of pages is to be erased 575. In some cases the instructions to erase a block are in conjunction with a garbage collection process. A set of first parameters associated with each page of the block are monitored 580. N pages with the highest wear rates are determined 585. The wear rates for the worst performing pages continue to be monitored 590 for a period of time. If the monitored wear rate for one or more pages of the worst performing pages exceeds a threshold value, then collection of a set of second parameters is triggered 595. The set of second parameters may be collected from the N pages or from all the pages of the memory block. The second set of parameters may be used to develop information for configuring 596 the read/write channel for future memory device operations e.g. write operations and/or read operations.

In some embodiments the worst performing pages of the block are monitored for a period of time, e.g., until the next erase operation of the block occurs or until a predetermine number of garbage collection operations is performed. After the period of time, the list of worst performing pages may be determined In some implementations, second parameters may be collected and stored. Each time a second parameter is collected, it replaces a previous value so that only the most recent value is stored. In some implementations, each time a second parameter is collected it is incorporated into a historical profile. For example, the historical profile may comprise a rate of change or a statistical value that is derived from the values of the second parameter that are collected over a period of time. For example, the statistical value may be a mean, median, or standard deviation. The historical profile may be maintained in the block header as previously discussed or elsewhere in the memory device. The read/write channel may be configured based on the historical profile.

Figure 6A:
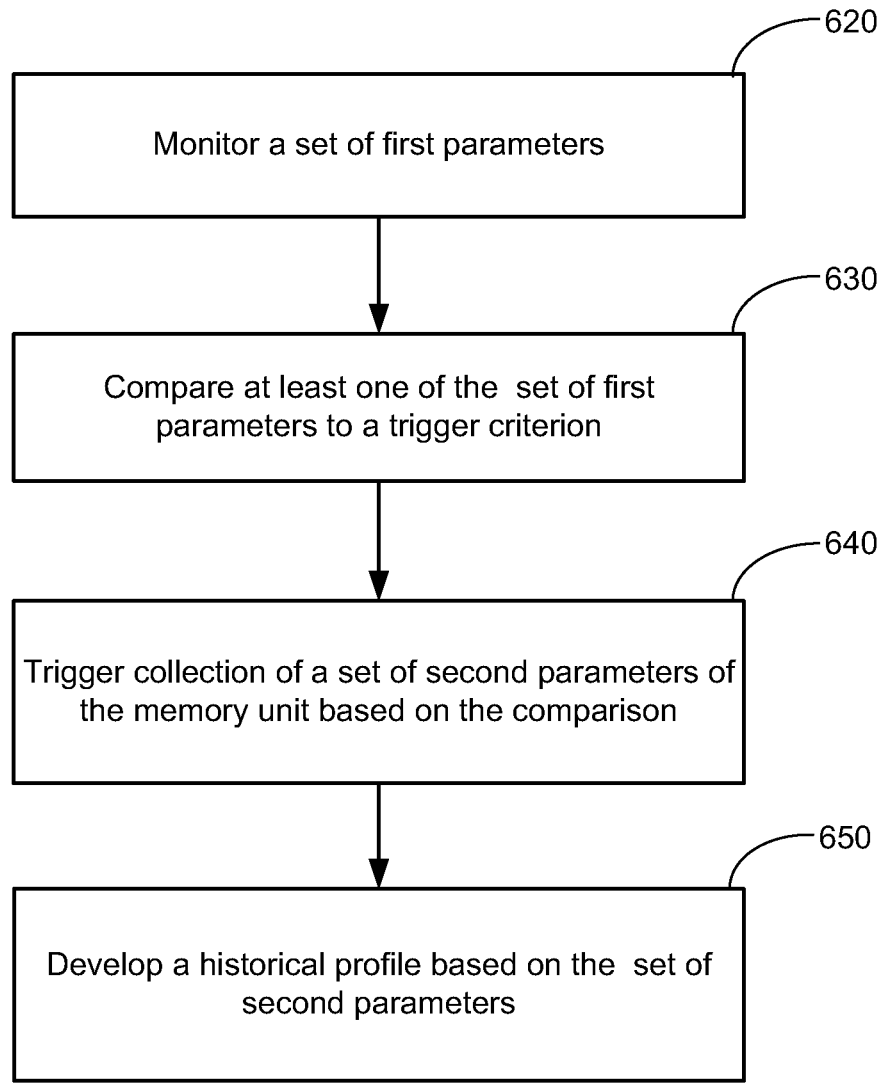
FIG. 6A is a flow diagram showing a process for developing a historical profile of collected parameters in accordance with various embodiments.

FIG. 6A is a flow diagram showing a process for developing a historical profile of collected parameters. A set of first parameters are monitored 620 for one or more pages of the block. The monitoring may occur, for example, according to intervals that correspond to garbage collection operations. The first parameters monitored may be associated with one page of the block or may be associated with more than one page of the block or even all of the pages of the block. At least one of the first set of parameters is compared 630 to a threshold. For example, the comparison may involve comparing a first parameter associated with one or more pages to trigger criterion or may involve comparing multiple first parameters associated with the one or more pages to respective trigger criterion.

Collection of a set of second parameters is triggered 640 based on the comparison. A historical profile is developed and/or maintained 650 based on the second set of parameters. Settings of a channel associated with the block may optionally be configured based on the historical profile. Optionally, the historical profile may be used to determine the lifetime of the memory or portions thereof. In some cases, a historical profile of the first set of parameters may also be developed, compared to the trigger criterion and used to trigger the collection of the second set of parameters.

Figure 6B:
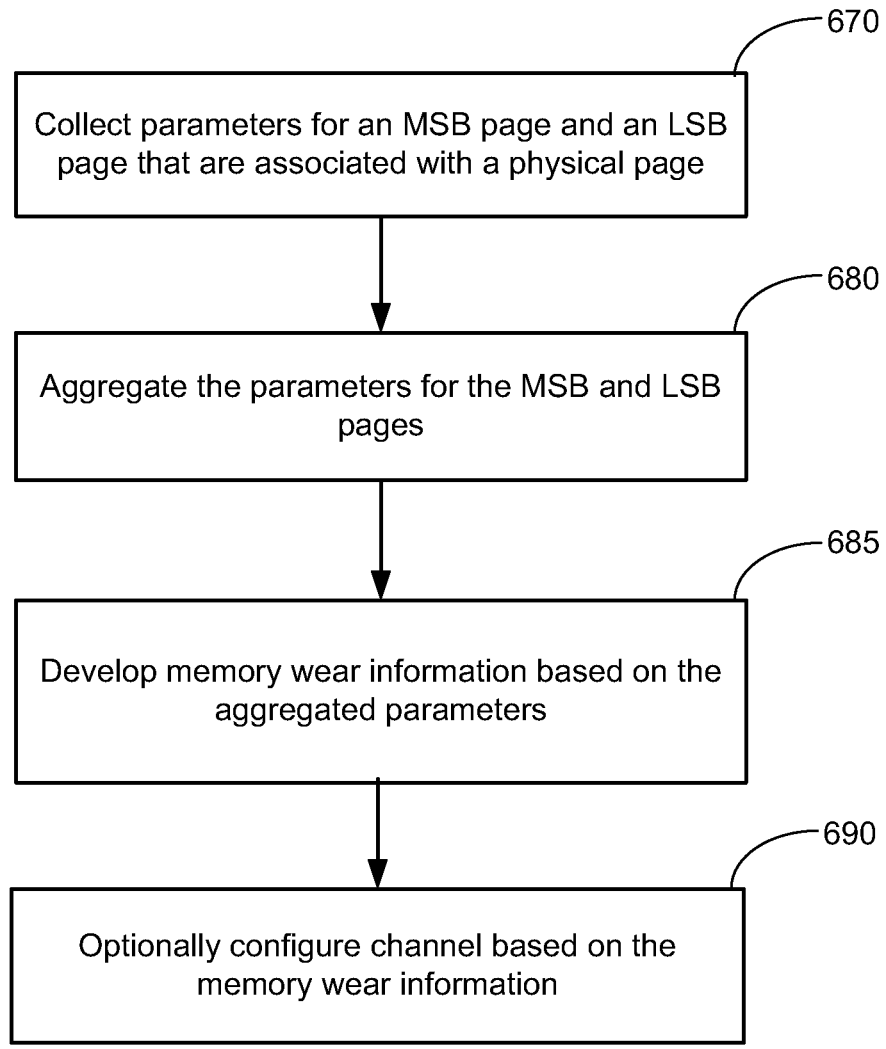
FIG. 6B is a flow diagram illustrating aggregation of parameters of most significant bit (MSB) memory units and least significant bit (LSB) memory units in accordance with some embodiments.

For multilevel memory, i.e., memory having memory cells capable of storing more than one bit of data, a physical page may store a most significant bit page (MSB page), a least significant bit page (LSB page), and possibly one or more intermediate significant bit pages (ISB pages). In these configurations, the parameters for the MSB, LSB, and ISB pages of a physical page may be aggregated. An exemplary process is illustrated in FIG. 6B. Parameters for an MSB page and an LSB page that are associated with the same physical page are collected 670. The MSB and LSB parameters are aggregated 680. Memory wear information is developed 685 from the second parameters and may be stored, e.g., in the storage area in the memory block. The memory wear information can optionally be used to configure 690 the read/write channel and/or may be optionally used to predict the lifetime of the device, or may be used for other purposes.

Figure 7A:
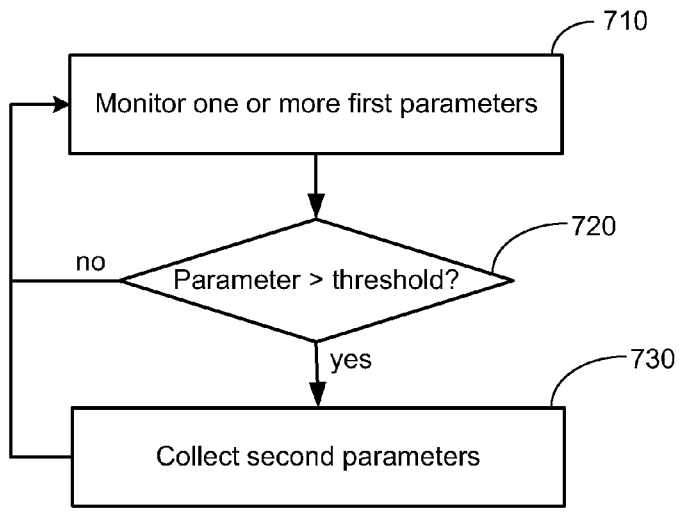
FIGS. 7A and 7B illustrate triggering the collection of second parameters of page in accordance with various embodiments.
Figure 7B:
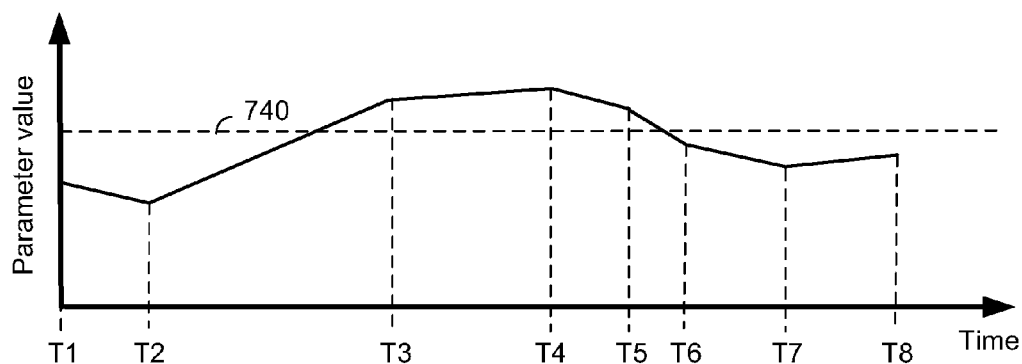

FIGS. 7A and 7B further illustrate triggering the collection of second parameters of page. As illustrated in FIG. 7A, in some cases collection of second parameters only occurs when a first parameter is beyond a threshold and does not occur if the first parameter is not beyond the threshold. According to FIG. 7A, one or more first parameters associated with a memory unit are monitored 710. The first parameters may be monitored at predetermined intervals of time or at random times. A determination 720 is made as to whether at least one of the monitored parameters is beyond its associated threshold. If so, collection of one or more second parameters of the page or block is triggered 730. In some cases, the second parameter involves a calculation based on the first parameters. In some implementations, the collection of the second parameters may include more frequent collection of parameter values. The process may continue to monitor 710 the first parameters. If it is determined 720 that the at least one of the first parameters is no longer beyond its respective threshold, the collection of the second parameters does not occur.

FIG. 7B shows a timing diagram for a first parameter value, e.g., BER, that is monitored during eight different system operations that take place at times T1-T8. A threshold 740 is shown in FIG. 7B for the monitored parameter. In this example, the monitored parameter value is beyond the threshold at time T3 at which time collection of the second parameters may be triggered. In one scenario, collection of the second parameters may cease when the first parameter again is within the threshold value, i.e., at T6. In another scenario, collection of the second parameters may continue regardless of the value of the first parameter after the first parameter is measured to be beyond the threshold. In yet another scenario, collection of the second parameters is triggered when the first parameter is beyond the threshold and collection of the second parameters ceases a predetermined period of time after the triggering.

Figure 8A:
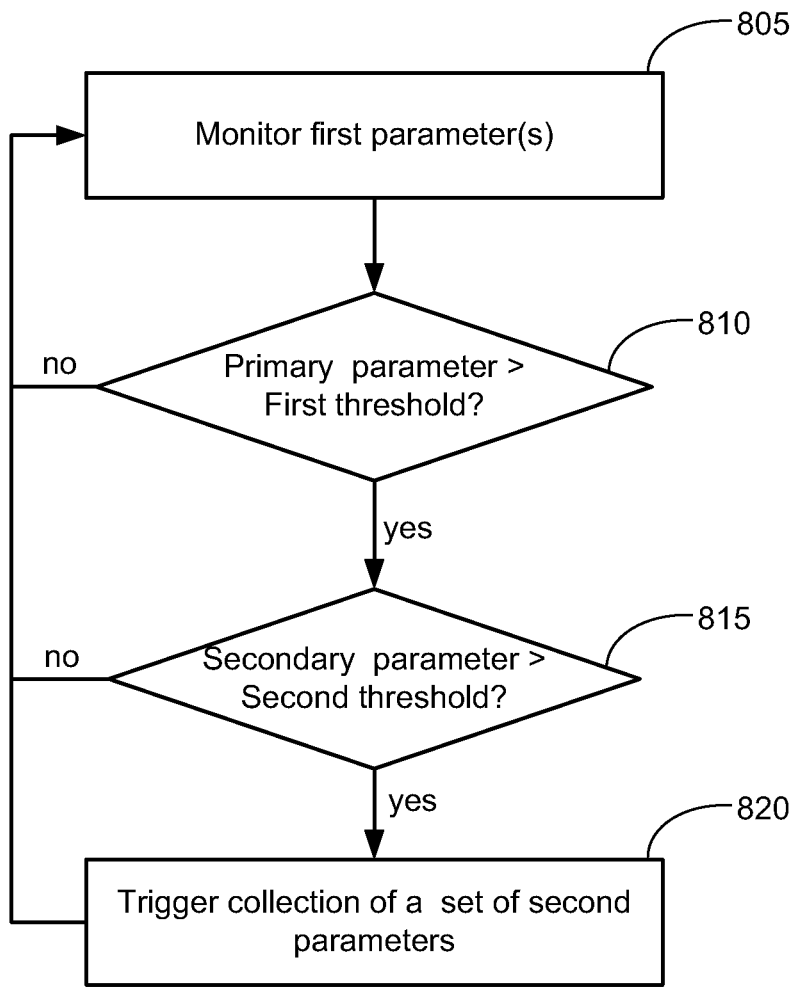
FIGS. 8A-8C are diagrams that illustrate triggering collection of parameters based on multiple thresholds in accordance with various embodiments.

More than one first parameter may also be used to trigger the collection of second parameters. FIGS. 8A-8D illustrate processes involved in triggering the collection of second parameters, e.g., page or block information, based on monitored values of first parameters. For example, the primary first parameter monitored may be number of program/erase cycles (P/E cycles) and the secondary first parameter may be bit error rate (BER). FIG. 8A is a flow diagram illustrating a method that uses multiple first parameters to trigger collection of second parameters. Note that although monitoring two parameters is illustrated in this example, more or less than two parameters may be monitored. According to this process, at least a primary first parameter, e.g., number of P/E cycles, is initially monitored 805. A determination 810 is made as to whether the primary first parameter is beyond a threshold. If it is determined 810 that the primary first parameter is not beyond its threshold, the process continues to monitor the primary first parameter. If it is determined 810 that the primary first parameter is beyond its respective threshold, the secondary first parameter is checked 815. If the secondary parameter is beyond its associated threshold, then collection of the set of second parameters is triggered 820. However, if it is determined 815 that the secondary first parameter is not beyond its associated threshold, then the primary and/or secondary first parameters may continue to be monitored without collecting the set of second parameters. As described previously, the second set of parameters may be the same as, different from, or may overlap the first set of parameters. After or during the collection of the second set of parameters, the process may continue to collect first parameters. The first and/or second parameters may be used to used to develop the memory wear information, may be used create a historical profile of the page and/or block to and/or may be used to trigger additional processes, for example.

Figure 8B:
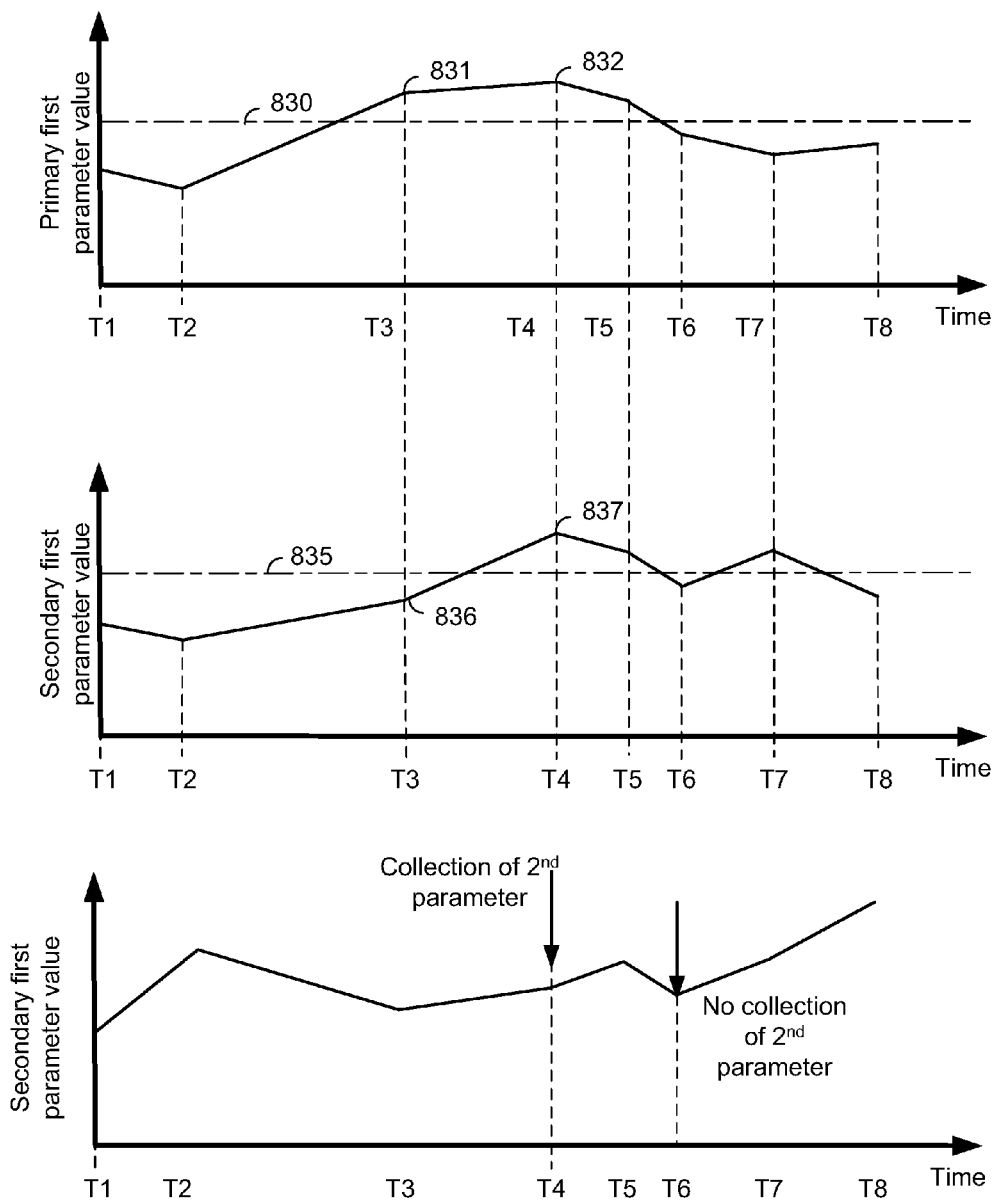

FIG. 8B is a timing diagram in which the collection of a set of second parameters is based on a primary first parameter and a secondary first parameter. Timing diagrams for the primary first parameter, the secondary first parameter, and a second parameter are shown in FIG. 8B. Values for the primary first parameter and the secondary first parameter are monitored at times, T1-T8. According to FIG. 8B, the value associated with the primary first parameter 831 exceeds the first threshold 830 at time T3. At this time, however, the value for the secondary first parameter 836 is below the second threshold 835. Because at least one of the monitored parameters is below its respective threshold 830, 835, collection of a second set of parameters is not yet triggered. At time T4, the value for the primary first parameter 832 still exceeds the first threshold 830 and as illustrated in FIG. 8B, the secondary first parameter 837 also exceeds the second threshold 835. Because both of the monitored first parameters exceed their respective thresholds 830, 835, collection of a second set of parameters is triggered.

Collection of the second set of parameters also occurs at time T5 because both of the primary and the secondary first parameters still exceed their associated thresholds 830, 835. At time T6, both the primary first parameter and the secondary first parameter drop below their respective thresholds 830, 835, and in one possible scenario, no collection of the second set of parameters is initiated for this time interval. At time T7, the secondary parameter is above the second threshold 835, but the primary parameter is below the first threshold 830 so collection of the second set of parameters is not triggered for this time interval.

Figure 8C:
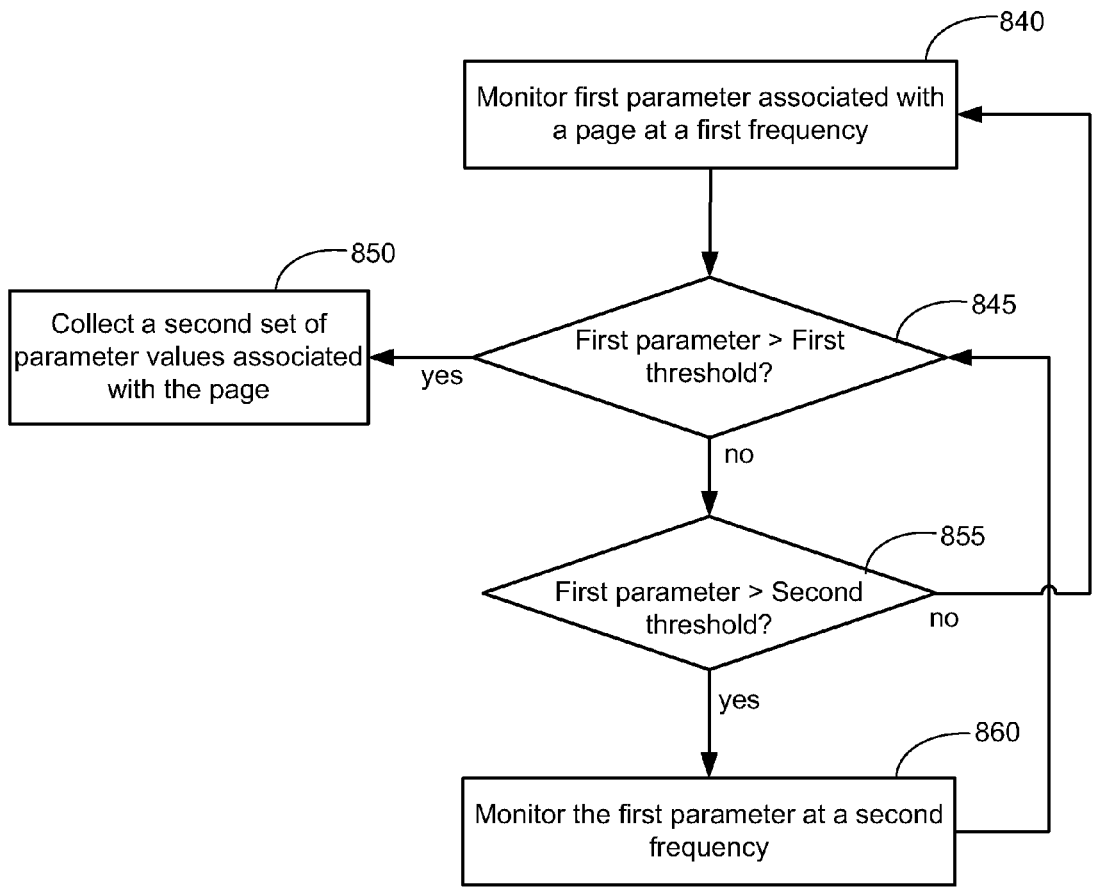

FIG. 8C is a flow diagram that illustrates another example of triggering the collection of second parameters. A first parameter associated with a page is monitored at a first frequency 840. The first parameter is compared 845 with a first threshold. If a determination 845 is made that the first parameter is beyond the associated threshold, then the comparison triggers 850 the collection of the second set of parameters. If it is determined 845 that the first parameter is not beyond the associated threshold, the first parameter is monitored 860 at a second frequency, e.g., a higher frequency.

The first parameter values may continue to be monitored 860 at the second frequency until the first parameter drops below the second threshold. In some cases, the first parameter is monitored for a period of time. If it is determined 855 that the first parameter is below a second threshold, the process will return to monitoring 840 the first parameter at the first frequency.

Figure 8D:
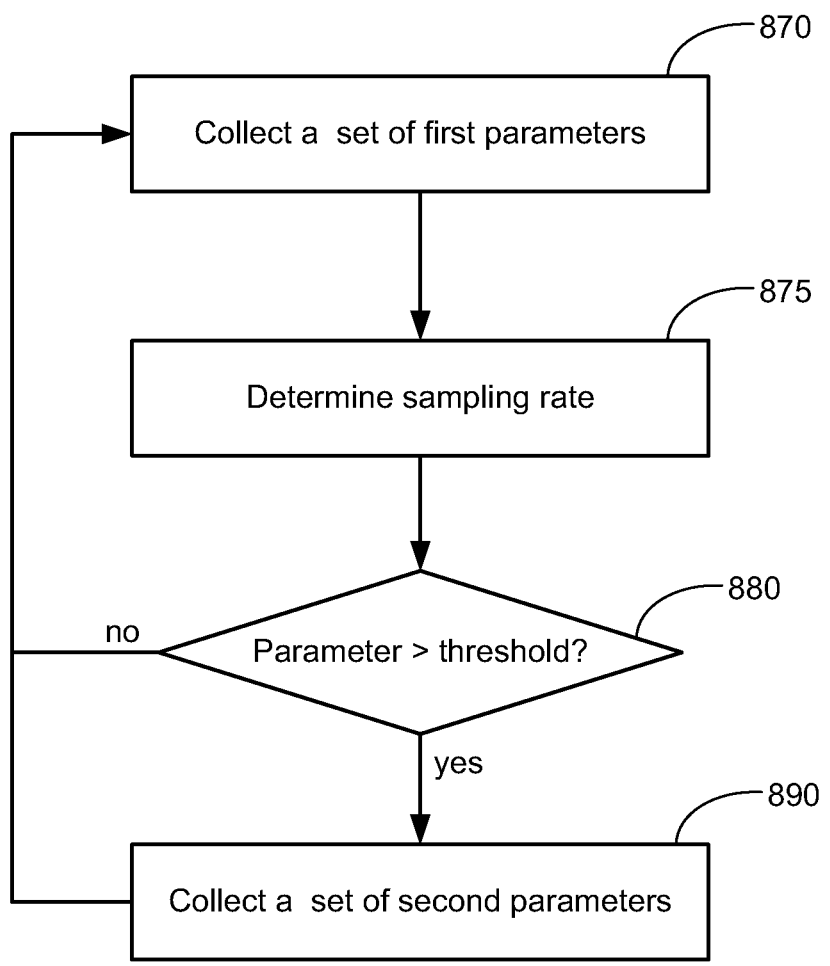
FIG. 8D provides example of adjusting the frequency at which a parameter is monitored or collected in accordance with various embodiments.

FIG. 8D provides another example of adjusting the frequency at which a parameter is monitored. A set of first parameters is monitored 870. Based on at least one of the first parameters, a monitoring frequency is determined 875. In some cases, the monitoring frequency is a function of, e.g., is proportional to, one or more of the set of first parameters. A determination 880 is made as to whether the at least one first parameter is greater than a threshold. If the value is not beyond 880 a threshold, the set of first parameters is continues to be monitored according to the current monitoring frequency 870. If the at least one first parameter at least one first parameter is beyond 880 the threshold, the second set of parameters is collected 890.

Figure 9:
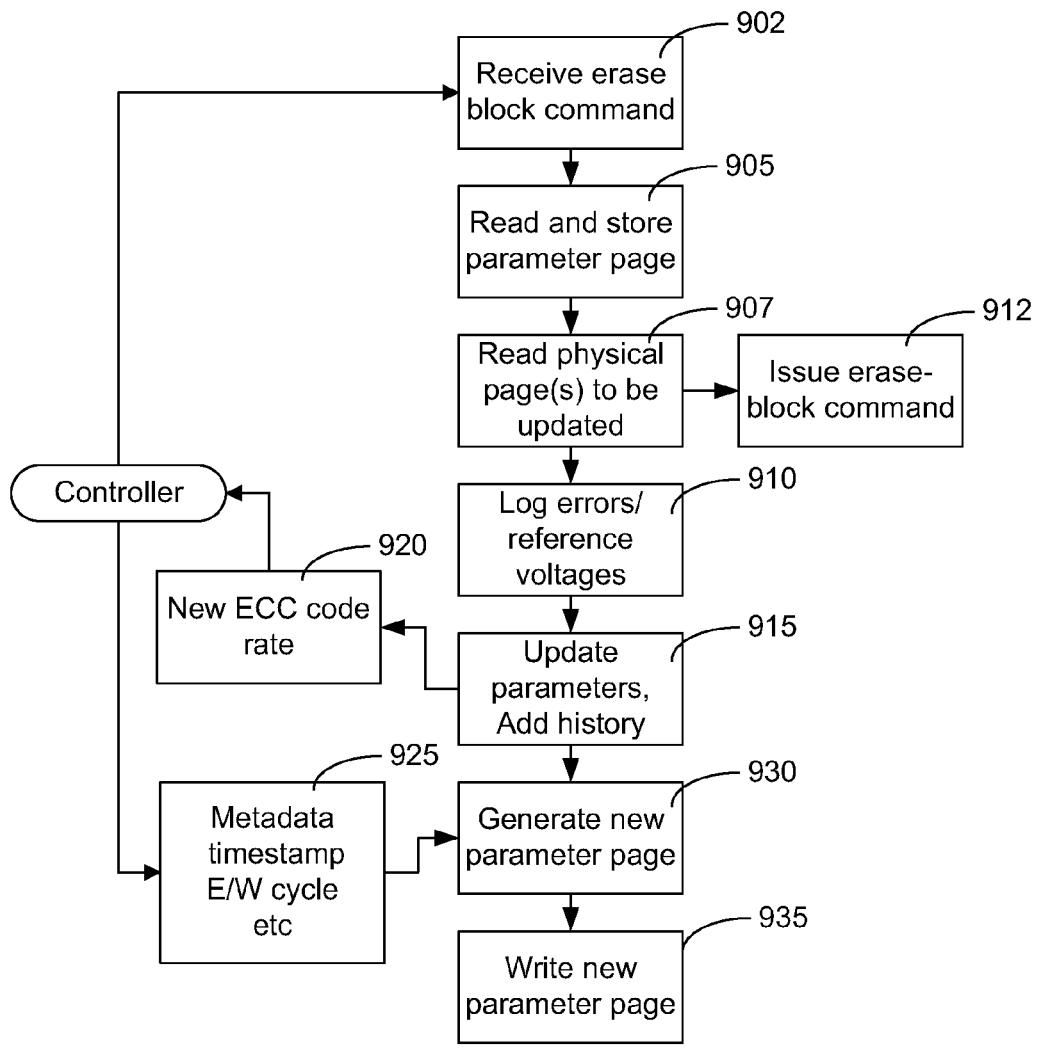
FIG. 9 is a flow diagram that illustrates a process for tracking parameters in conjunction with a garbage collection operation in accordance with various embodiments.

FIG. 9 is a flow diagram that illustrates a process for tracking parameters in conjunction with a garbage collection operation. In this process, parameters and/or memory wear information for the block are stored in the block in a parameter page (or pages). The garbage collection module of the memory controller issues a block erase command which is received 902 by the memory. The parameter page for the block is read 905 and is stored in a temporary location outside the block. The pages to be updated during the garbage collection are read 907. After the pages are read from the block, the block can be erased 912. Errors that occur while reading the pages and/or reference voltages used to read the pages are logged 910. For example, for single or multi level memory cells, a log of errors may include counts for each combination of voltage level written and voltage level read. The collected parameters are updated, a historical profile and/or memory wear information for the block may also be updated 915. A new ECC code rate is determined and updated in the controller. The controller contributes 925 additional collected parameters, e.g., metadata, timestamp, and number of P/E cycle. The new parameter page is generated 930 using the updated parameters and the additional parameters contributed by the controller. The new parameter page is written 935 to its new location.

As discussed above, flash cells (or other types of non-volatile memory cells) may degrade with wear caused by P/E cycles which results in wider programmed voltage distributions, poorer ability to retain charge and greater sensitivity to various mechanisms that disturb the stored charge. Hence, data recovery is complicated by signal and noise characteristics that change with P/E cycles and with retention time. Some strategies that deal with this variability may include: conserving overhead by varying ECC power with number of P/E cycles; varying programming voltage with number of P/E cycles to reduce wear and/or retention loss; attempting to predict best reference voltages as a function of P/E cycles and retention time. However, the effectiveness of these or other data recovery strategies depends on how well the estimated signal and noise characteristics match the actual behavior and will be greatly impacted by variations across a population of parts and/or even by block and/or page. Furthermore, there is a corresponding variability in the rate of wear of each block/page that impacts the effectiveness of wear leveling based primarily on a P/E cycle count.

Embodiments discussed herein involve methods that can be used to characterize each block multiple times over the life of the product and to efficiently store and access such information. The examples discussed include at least the following approaches: opportunistic characterization of memory during garbage collection; efficient means for storing and retaining locally relevant parameters; strategies for aggregating collected parameters; and methods to efficiently access a parameter storage area. Characterization of memory may involve collecting parameters of the memory cells, pages, or blocks.

Some characteristics of a part may be able to be predicted. This prediction can be the result of determining a worst case degradation and/or determining an average degradation for that part. However, knowledge of signal and noise characteristics of flash memory based on population statistics and/or vendor characterizations or part characterization at the factory, may not be adequate to predict the behavior of an individual part, or portions of it (blocks and/or pages) over the part's lifetime. Hence, more frequent characterization of each page of memory, i.e., collection of relevant parameters, may be used to adaptively select the channel settings that are most effective in extending the lifetime of the memory and to derive enhanced wear estimates that will in turn improve the effectiveness of wear leveling across the memory.

The collected parameters of the memory may be retained for several reasons, e.g., the collected parameters are not used at the time they are collected, but are used to determine channel settings for future write and/or read operations. Parameter history may be used to model signal and noise as a function of P/E cycles and retention time.

It is useful to decrease the amount of information stored in temporary storage, and to decrease the performance impact of additional reads and/or writes required to process the collected information. The parameters collected may include any metadata that helps with reading and/or writing data, error recovery or wear leveling, including timestamp, accumulated P/E cycles, etc.

Opportunistic collection of parameters may occur during garbage collection. Because every block goes through garbage collection multiple times over the life of the product, garbage collection is a good opportunity to process all or most of the pages in a block at the same time in contrast to a normal read operations which will only access a small fraction of a block. It may be more efficient to read all of the pages in a block, rather than only those that are being refreshed. Because of simultaneous reading of multiple planes and physical pages that are larger than the typical read request size, much of the stale data may be read with no performance penalty during garbage collection.

Embodiments discussed herein may involve one or more processes, including: selection of whether to read all the pages or only those being refreshed; on-the-fly computations of error event counts, i.e. counts for each combination of level written and level read; aggregating collected parameters from the MSB and LSB pages that correspond to the same physical page; collecting parameters of individual pages based on programmable criteria such as bit error rate, counts for specific error events or retry counts; measuring voltage distribution for each of the logical levels; and efficient means for storing and retaining locally relevant parameters, e.g., parameters relevant to a block are stored in the block header.

Embodiments described in this disclosure include that the collected parameters and memory wear information relevant to a block are stored in a dedicated block header area in the block, e.g., at the beginning of a block. The collected parameters and/or memory wear information may be stored in a temporary location while the block is erased, but only for a relatively short time. The block header may be written as soon as the block erase is completed. This approach applies to erase units that treat a group of multiple blocks as a single entity. The parameter header can be one or more pages in size.

In some applications it may not be practical or possible to either collect parameters, develop memory wear information and/or apply read/write channel settings with a page granularity, due, for example, to hardware limitations or the storage overhead. In these applications, the collected parameters of the pages may be aggregated. For example, the parameters and/or memory wear information may be combined into block-level values, e.g., combined error rate, error event counts, reading and writing threshold s, ECC code rate. Even for block headers that cover multi-block erase units, the collected parameters and memory wear information may be aggregated at a block level to account for part to part variations.

In some cases, the timestamp corresponding to the block erase time may be stored in the block header. The time differential between the block erase time and the time a page is written may be stored within each page of the block. For each block one or more of the following parameters may be collected and stored: statistics about the error rate and error event distributions by page; list of N pages with the worst error rates; the number and/or list of pages with the highest wear rate; a history of aggregated parameters for some number of erase cycles.

The read/write channel settings for writing and reading are needed each time a page is read or written, potentially impacting performance. Some embodiments involve strategies that reduce the number of times the collected parameter storage area is read. For example, in some types of memory, data is written sequentially, with a relatively small number of write streams active at any one time. The proposed sequence is to read the storage area that includes the memory wear information, e.g., configuration information used to configure the read/write channel to compensate for memory wear, and store the configuration information in temporary storage that is allocated to a write stream. Only a single read of the storage area is needed to write an entire block or erase unit.

Reading memory pages can be random or sequential. Random reads would incur significant latency if the parameter storage area needs to be read before each read. The proposed method to mitigate this effect is to store all of the on-the-fly read configuration information for each block in temporary storage. For example, an ECC code rate is an example of on the fly read information that may be used to read any part of the block, including the storage area. The preferred embodiment is to store the ECC code rate in readily accessible non-volatile storage. However, if a volatile copy is used it can be recreated on power up by reading with all possible ECC Code Rates to ensure that the ECC code rate parameter will converge. Another possible on-the-fly parameter includes a coarse time stamp which is a value that is helpful to all the pages in the block or GCU.

It is to be understood that even though numerous characteristics of various embodiments have been set forth in the foregoing description, together with details of the structure and function of various embodiments, this detailed description is illustrative only, and changes may be made in detail, especially in matters of structure and arrangements of parts illustrated by the various embodiments to the full extent indicated by the broad general meaning of the terms in which the appended claims are expressed.

What is claimed is:

1. A method of operating a controller for a charge storage memory device, wherein the memory device comprises blocks of memory units, the method comprising:
monitoring a set of first parameters of at least one of the memory units of the memory device, the set of first parameters associated with wear of the memory device and the monitoring including measuring the first parameters at each of multiple first intervals that occur over a time period that the memory device is in operation and that are timed according to block-level memory device operations;
comparing the first parameters to respective trigger criterion;
in response to the comparing, triggering collection of a set of second parameters associated with wear of the memory device;
developing memory wear information using the second parameters: and
storing at least one of the first parameters and the second parameters for each block of memory units in a storage area within the block of memory units.

2. The method of claim 1, wherein the set of first parameters overlaps the set of second parameters.

3. The method of claim 1, wherein the memory wear information comprises channel configuration information used to configure a read/write channel of the memory device to compensate for wear of the memory device.

4. The method of claim 1, wherein:
the blocks of the memory units are garbage collection units; and
the block level memory device operations are garbage collection operations.

5. The method of claim 1, further comprising:
moving the first and second parameters stored in the storage area to a temporary storage location while a block level operation is being performed on the block of memory units;
measuring a current set of second parameters;
updating the set of second parameters using the current set of second parameters; and
storing the updated set of second parameters in the storage area after the block-level memory device operation has been performed on the block of memory units.

6. The method of claim 1, wherein:
monitoring the set of first parameters of the at least one memory unit comprises monitoring the set of first parameters for multiple memory units of a block and combining the first parameters of the multiple memory units to form one or more block level first parameters; and
comparing the first parameters to respective trigger criterion comprises comparing the block level first parameters to respective block level trigger criterion.

7. The method of claim 1, further comprising forming a historical profile using the set of second parameters.

8. The method of claim 1, wherein the memory wear information comprises memory lifetime information.

9. A system comprising:
a memory device;
a controller comprising;
a block level operation module configured to perform garbage collection operations on multiple memory blocks, each memory block comprising multiple memory units;
a parameter control module configured to, for each memory block:
monitor a set of first parameters associated with wear of at least one garbage collection unit of the memory block by measuring the set of first parameters during each garbage collection operation;
compare the first parameters to respective trigger criterion; and
in response to the comparison, trigger collection of a set of second parameters associated with wear of the memory block; and
a channel control module configured to develop memory wear information using the set of second parameters.

10. The system of claim 9, wherein the memory device comprises a flash memory device.

11. The system of claim 9, wherein monitoring the set of first parameters involves less system overhead than collecting the set of second parameters.

12. The system of claim 9, wherein:
the at least one memory unit comprises a memory unit having a higher wear rate than other memory units of the memory block.

13. The system of claim 9, wherein each memory block includes a storage area and second parameters for each memory block are stored in the storage area of the memory block.

14. The system of claim 9, wherein the parameter control module is configured to increase a frequency at which the set of second parameters is collected based on the set of first parameters.

15. The system of claim 9, wherein the parameter control module is configured to store at least one of the first parameters and the second parameters for each garbage collection unit in a storage area within the garbage collection units.

16. A system comprising:
a memory device;
a controller comprising;
a block level operation module configured to perform block level operations on multiple memory blocks, each memory block comprising multilevel memory cells capable of storing a most significant bit (MSB) and a least significant bit (LSB);
a parameter control module configured to, for each memory block;
monitor a set of first parameters associated with wear of at least one memory unit of the memory block by measuring the set of first parameters during each block level operation;
compare the first parameters to respective trigger criterion; and
in response to the comparison, measure a set of second parameters for a memory unit of MSBs and to measure the set of second parameters for a memory unit of LSBs and to aggregate the set of second parameters for the MSB memory unit and the set of second parameters for the LSB memory unit into an aggregate set of second parameters, wherein the MSB memory unit and the LSB memory unit are stored together in one physical memory unit: and
a channel control module configured to develop memory wear information using the set of second parameters.

17. A system comprising:
a memory device;
a controller comprising;
a block level operation module configured to perform block level operations on a memory block comprising multiple memory units;
a parameter control module configured to, for each memory block:
monitor a set of first parameters associated with wear of at least one memory unit of the memory block by measuring the set of first parameters of the at least one memory unit during block level operations;
compare the first parameters to respective trigger criterion; and
in response to the comparison, trigger collection of a set of second parameters associated with wear of the memory block, wherein collection of the set of second parameters includes measuring the second parameters during block level operations; and
a read/write channel control module configured to develop channel configuration information that compensates for memory wear using the set of second parameters and to use the channel configuration information to configure a read/write channel to access the memory units of the memory block.

18. The system of claim 17, wherein the channel configuration is stored in a temporary location and the read/write channel control module is configured to use the channel configuration information stored in the temporary location to configure the read/write channel for on-the-fly read operations.

19. The system of claim 17, wherein the channel configuration information is stored in a temporary location and the read/write channel control module is configured to use the channel configuration information stored in the temporary location to configure the read/write channel for sequential write operations of the multiple memory units of the memory block.

* * * * *